(12) United States Patent
Hayakawa

(10) Patent No.: US 11,511,695 B2
(45) Date of Patent: Nov. 29, 2022

(54) STEERING WHEEL WITH AIRBAG APPARATUS AND DAMPER APPARATUS

(71) Applicant: Joyson Safety Systems Japan K.K., Tokyo (JP)

(72) Inventor: Shinji Hayakawa, Shiga (JP)

(73) Assignee: Joyson Safety Systems Japan K.K., Tokyo (JP)

( * ) Notice: Subject to any disclaimer, the term of this patent is extended or adjusted under 35 U.S.C. 154(b) by 0 days.

(21) Appl. No.: 17/305,601

(22) Filed: Jul. 12, 2021

(65) Prior Publication Data

US 2022/0055564 A1 Feb. 24, 2022

(30) Foreign Application Priority Data

Aug. 19, 2020 (JP) .............................. JP2020-138730

(51) Int. Cl.
*B60R 21/203* (2006.01)
(52) U.S. Cl.
CPC .................................. *B60R 21/203* (2013.01)
(58) Field of Classification Search
CPC .............. B60R 21/203; B60R 21/2037; B60R 2021/2173; B60R 2021/2175
See application file for complete search history.

(56) References Cited

U.S. PATENT DOCUMENTS

| 5,410,114 | A | * | 4/1995 | Furuie | ..................... | B60Q 5/003 200/61.55 |
| 5,651,535 | A | * | 7/1997 | David | .................... | F16F 1/3732 267/153 |
| 5,775,725 | A | * | 7/1998 | Hodac | .................. | B60R 21/2037 411/348 |
| 6,394,434 | B2 | * | 5/2002 | Wolf | ..................... | F16F 1/3732 267/293 |
| 10,406,975 | B2 | * | 9/2019 | Obayashi | ............... | B60Q 5/003 |
| RE47,687 | E | * | 11/2019 | Umemura | .............. | B62D 7/222 |
| 2011/0120258 | A1 | | 5/2011 | Kondo et al. | | |
| 2013/0221641 | A1 | | 8/2013 | Kondo et al. | | |
| 2014/0306432 | A1 | | 10/2014 | Obayashi et al. | | |
| 2017/0361801 | A1 | * | 12/2017 | Banno | ................. | B60R 21/2037 |
| 2020/0331511 | A1 | | 10/2020 | Minami et al. | | |

FOREIGN PATENT DOCUMENTS

| JP | 2011-110941 | 6/2011 |
| JP | 2016-028963 | 3/2016 |
| JP | 2017-218033 | 12/2017 |
| JP | 2018-149837 | 9/2018 |
| WO | 2012/032860 | 3/2012 |
| WO | 2013/077215 | 5/2013 |

\* cited by examiner

*Primary Examiner* — Laura Freedman
(74) *Attorney, Agent, or Firm* — IPUSA, PLLC (57) ABSTRACT

A steering wheel includes a steering wheel body, a retainer supported by the steering wheel body and provided with a hole, an airbag apparatus fixed to the retainer, and a damper apparatus disposed between the steering wheel body and the retainer. One end of the damper apparatus is fixed to the retainer by being fitted into the hole provided in the retainer. The damper apparatus includes an elastic body. The elastic body extends in a circumferential direction along an inner edge of the hole and is formed so as to fit the inner edge of the hole. The inner edge of the hole of the retainer is bent such that the end of the inner edge does not contact the elastic body.

3 Claims, 8 Drawing Sheets

STEERING WHEEL WITH AIRBAG APPARATUS AND DAMPER APPARATUS

CROSS-REFERENCE TO RELATED APPLICATIONS

This application is based on and claims priority to Japanese Patent Application No. 2020-138730, filed on Aug. 19, 2020, the entire contents of which are incorporated herein by reference.

BACKGROUND OF THE INVENTION

1. Field of the Invention

The disclosures herein relate to a steering wheel.

2. Description of the Related Art

In a conventional steering wheel with an airbag apparatus, a damper apparatus is provided between the steering wheel body and a retainer to which the airbag apparatus is attached. The damper apparatus reduces vibrations of the steering wheel body by transmitting vibrations from the steering wheel body to the retainer (see Patent Document 1, for example).

However, structurally, coupling the conventional steering wheel body to the retainer via a damper apparatus is complicated, and requires a high number of parts.

RELATED-ART DOCUMENTS

Patent Documents

Patent Document 1: U.S. Pat. No. 8,985,623

SUMMARY OF THE INVENTION

It is a general object of the present disclosure to provide a steering wheel that can be assembled with a reduced number of parts.

According to at least one embodiment, a steering wheel includes a steering wheel body, a retainer supported by the steering wheel body and provided with a hole, an airbag apparatus fixed to the retainer, and a damper apparatus disposed between the steering wheel body and the retainer. One end of the damper apparatus is fixed to the retainer by being fitted into the hole provided in the retainer. The damper apparatus includes an elastic body. The elastic body extends in a circumferential direction along an inner edge of the hole and is formed so as to fit the inner edge of the hole. The inner edge of the hole of the retainer is bent such that the end of the inner edge does not contact the elastic body.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

According to the present disclosure, a steering wheel that can be assembled with a reduced number of parts is provided.

In the following, embodiments of the present invention will be described with reference to the accompanying drawings. For convenience of description, the same elements are denoted by the same reference numerals in the drawings, and a duplicate description thereof will be omitted.

In the following direction, an x-direction, a y-direction, and a z-direction are perpendicular to each other. The x-direction is the direction of the rotation axis of a steering wheel. The y-direction is the direction connecting a steering shaft mounting hole 28 and one of a plurality of pins 45. Typically, the y-direction is the vertical direction. For convenience of description, the negative y-side may be referred to as an upper side, and the positive y-side may be referred to as a lower side.

Figure 1:
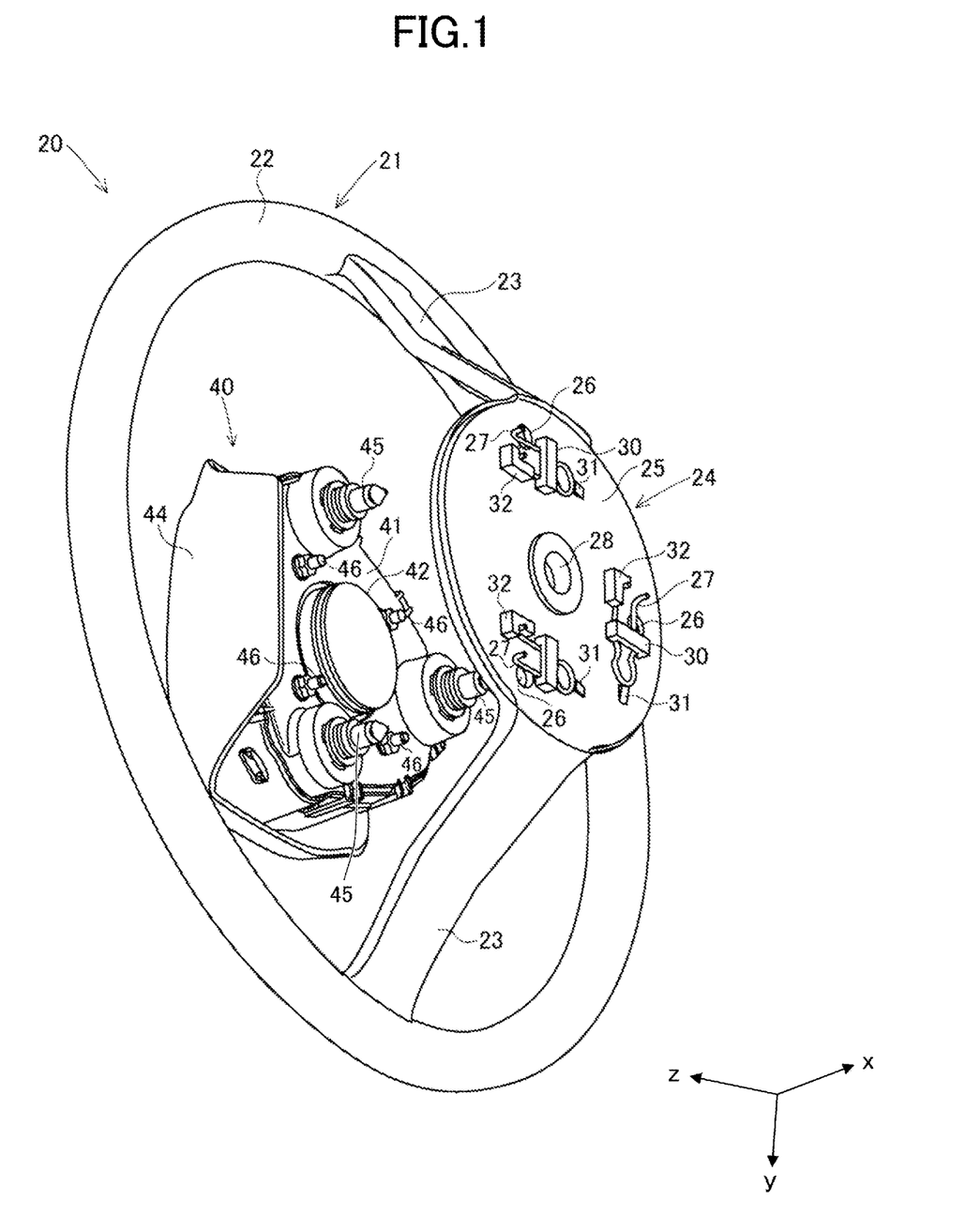
FIG. 1 is an exploded perspective view of a steering wheel according to an embodiment.
Figure 2:
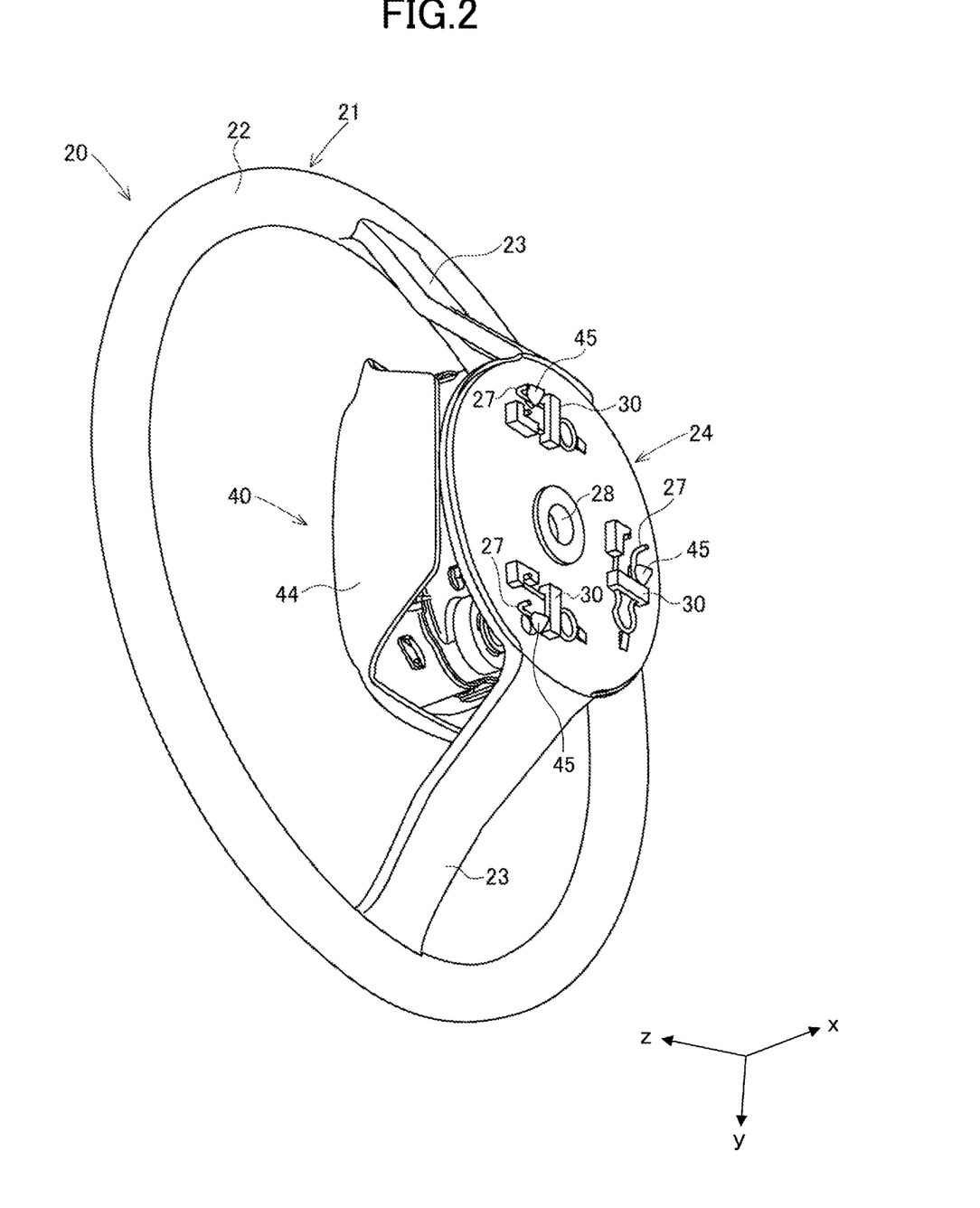
FIG. 2 is an assembled perspective view of the steering wheel according to the embodiment.

Referring to FIG. 1 and FIG. 2, an example configuration of a steering wheel 20 according to an embodiment will be described. FIG. 1 is an exploded perspective view of the steering wheel 20 according to the embodiment. FIG. 2 is an assembled perspective view of the steering wheel 20 according to the embodiment.

As illustrated in FIG. 1 and FIG. 2, the steering wheel 20 includes a steering wheel body 21 and an airbag apparatus 40. The airbag apparatus 40 is attached to the steering wheel body 21. The steering wheel body 21 includes a wheel 22, spokes 23, and a boss 24 (core metal).

The boss 24 includes a disc-shaped airbag apparatus attachment part 25, a pin insertion hole 26 provided in the airbag apparatus attachment part 25, a lock spring 27, and a steering shaft mounting hole 28 provided in the center of the boss 24.

The lock spring 27 has an approximately U shape, and is disposed such that one side of the lock spring 27 crosses the insertion hole 26 in a chord direction. The attachment part 25 is provided with a tunnel-shaped spring holder 30, and stoppers 31 and 32 for positioning the lock spring 27. The lock spring 27 is inserted into the spring holder 30 and is positioned in contact with the stoppers 31 and 32. In this manner, the lock spring 27 is attached to the attachment part 25 such that the one side of the lock spring 27 crosses the insertion hole 26 in the chord direction, as described above.

The airbag apparatus 40 includes a retainer 41, an inflator 42, an airbag 43 (see FIG. 3), a module cover 44, and the plurality of (three, in the present embodiment) pins 45. The inflator 42 and the airbag 43 are attached to the retainer 41, the module cover 44 covers the airbag 43, and the plurality of pins 45 are disposed to project from the retainer 41 toward the attachment part 25.

The airbag 43 is folded and is attached to the retainer 41 with bolts 46 together with the inflator 42. Upon the generation of gas by the inflator 42 in the event of a vehicle collision, the airbag 43 is inflated and the module cover 44 is torn such that the airbag 43 is deployed.

As illustrated in FIG. 1, when the airbag apparatus 40 is attached to the attachment part 25, each of the pins 45 is positioned so as to face the insertion hole 26. Then, the airbag apparatus 40 is moved toward the attachment part 25 in the positive X-direction, and each of the pins 45 is inserted into the insertion hole 26. As illustrated in FIG. 2, when a tapered portion 45A at the distal end of each of the pins 45 passes through the insertion hole 26 and advances to the other side, the lock spring 27 engages with a groove 45B, thereby allowing the pins 45 to be rigidly fixed to the attachment part 25. The groove 45B is formed in the outer peripheral surface, on the distal end side relative to the tapered portion 45A, of each of the pins 45, and extends in the circumferential direction.

Note that each of the pins 45 is an element of a damper apparatus 50, which will be described below. That is, the airbag apparatus 40 (retainer 41) is supported by the steering wheel body 21 via the damper apparatus 50.

Figure 3:
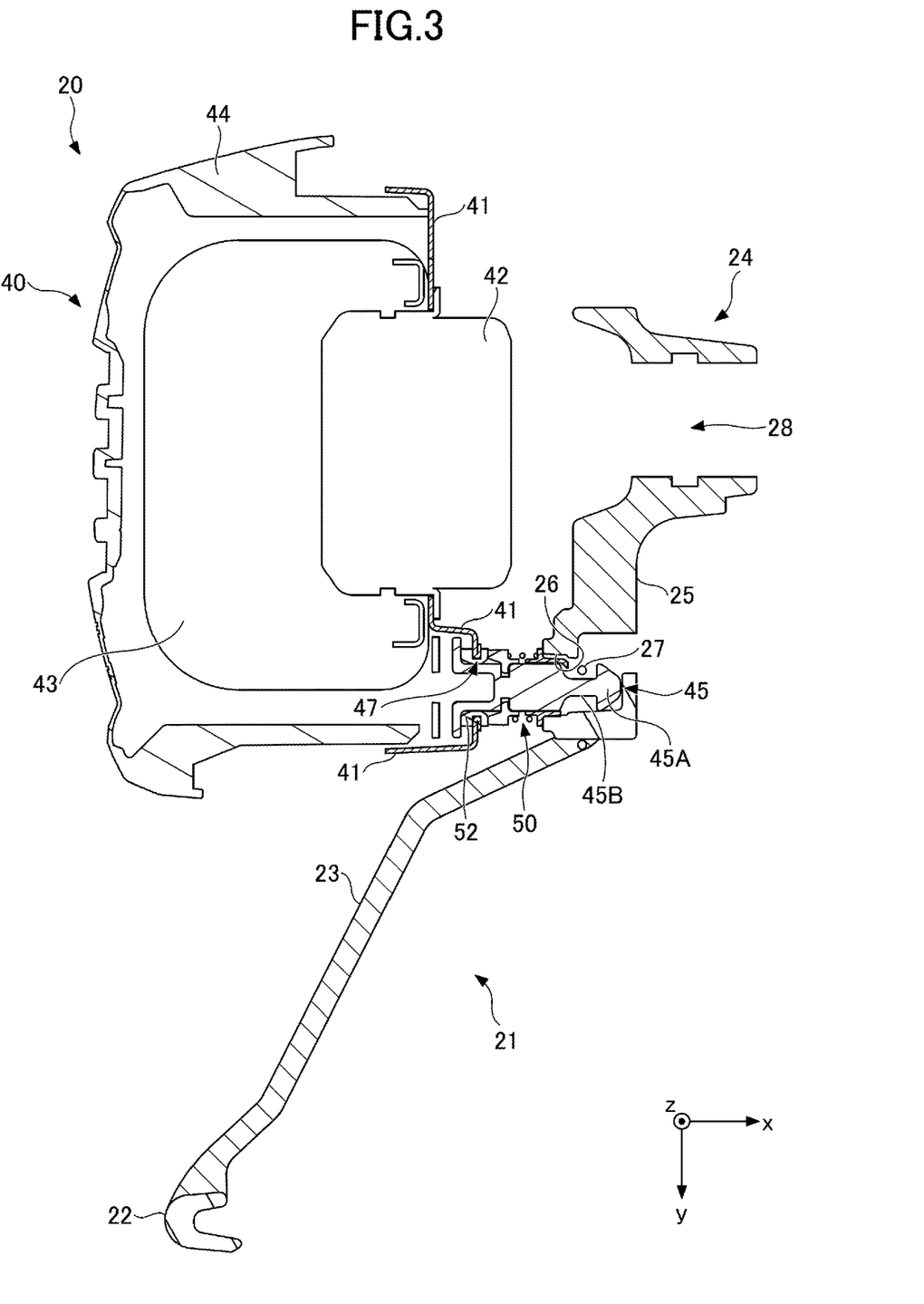
FIG. 3 is a cross-sectional view of a main part of the steering wheel.
Figure 4:
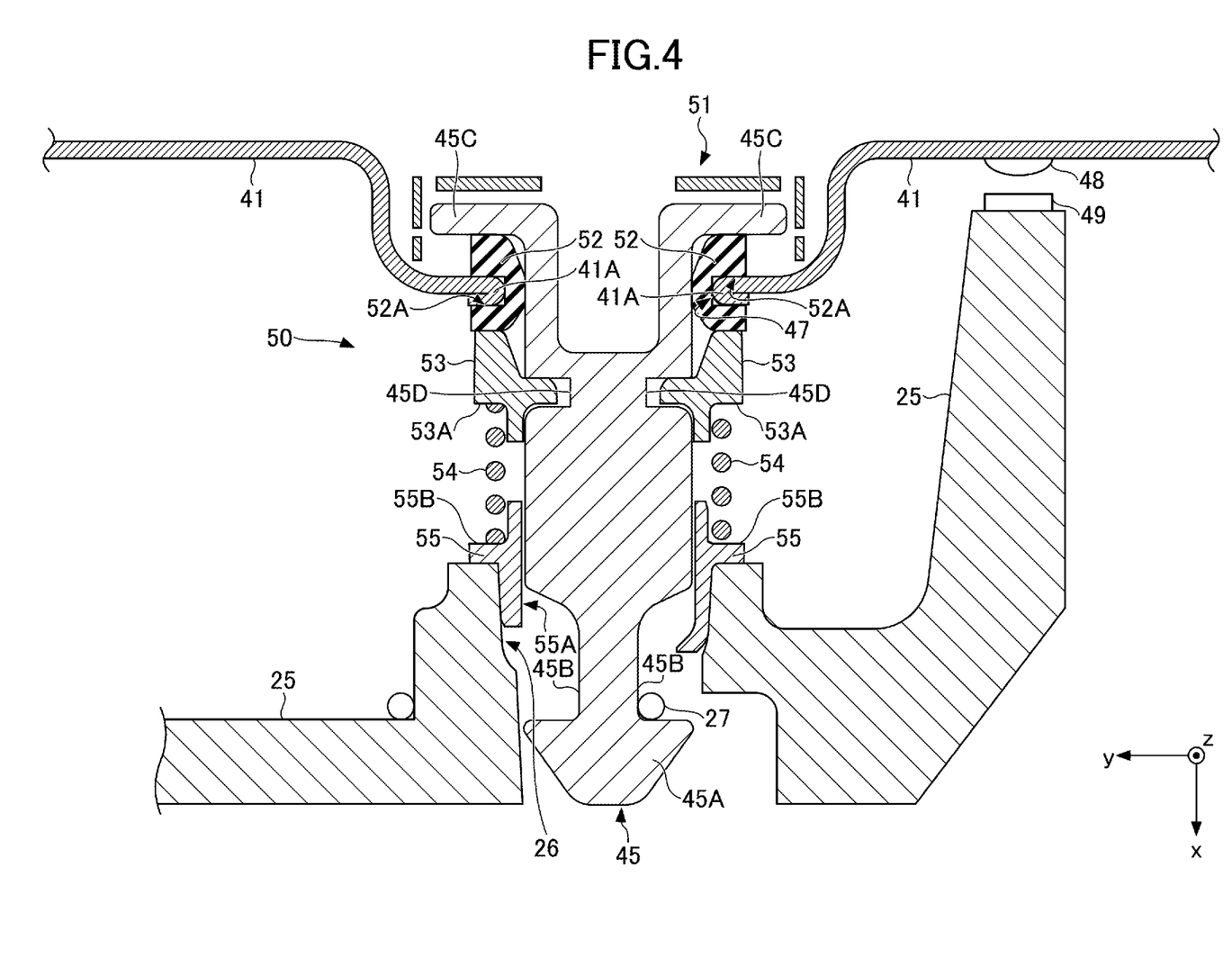
FIG. 4 is an enlarged cross-sectional view of the vicinity of a damper apparatus of the steering wheel.

The damper apparatus 50 according to the embodiment will be described with reference to FIG. 3 and FIG. 4. FIG. 3 is a cross-sectional view of a main part of the steering wheel 20. FIG. 4 is an enlarged cross-sectional view of the vicinity of the damper apparatus 50 of the steering wheel 20. FIG. 3 and FIG. 4 depict cross sections taken in the y-direction, for example. In FIG. 3, the airbag apparatus 40 and a lower part of the steering wheel body 21 of the steering wheel 20 are depicted. For convenience of description, a part of the configurations illustrated in FIG. 3 and FIG. 4 may differ from those illustrated in FIG. 1 and FIG. 2. Further, a part of the configuration illustrated in FIG. 3 may differ from that illustrated in FIG. 4.

As described above, the airbag apparatus 40 is fixed to the retainer 41. The damper apparatus 50 is disposed between the steering wheel body 21 and the retainer 41. The damper apparatus 50 extends in the x-direction when assembled into the steering wheel 20. One end (proximal end) of the damper apparatus 50 is fixed to a fixing element (in the present embodiment, the retainer 41) by being fitted into a hole 47 provided in the fixing element (the retainer 41). Further, in the present embodiment, the other end (distal end), including the tapered portion 45A and the groove 45B, of the damper apparatus 50 is fixed to the airbag apparatus attachment part 25 of the steering wheel body 21. In response to an external force from the airbag apparatus 40 side or the steering wheel body 21 side, the damper apparatus 50 can contract between a position where the damper apparatus 50 is fixed to the retainer 41 and a position where the damper apparatus 50 is fixed to the airbag apparatus attachment part 25. In this manner, the damper apparatus 50 can reduce vibrations of the steering wheel body 21 by transmitting vibrations from the steering wheel body 21 to the airbag apparatus 40.

Further, the damper apparatus 50 may also functions as a horn apparatus. For example, as illustrated in FIG. 4, a contact 48 and a contact 49 may be disposed on the retainer 41 and the airbag apparatus attachment part 25, respectively, to face each other. When a driver presses the airbag apparatus 40 of the steering wheel 20 to sound a horn, the airbag apparatus 40 of the steering wheel 20 is moved toward the steering wheel body 21 side (toward the positive x-side). At this time, in response to the contraction of the damper apparatus 50, the contact 48 makes contact with the contact 49, thereby causing the horn to sound.

The damper apparatus 50 includes a pin 45 as described above, a cover 51, a rubber element 52 (an elastic body), a stopper 53, a spring 54, and a slider 55.

As described above, the pin 45 includes the tapered portion 45A, serving as a distal end portion, and the groove 45B. The groove 45B is adjacent to the tapered portion 45A, and is located on the proximal end side (negative x-side) relative to the tapered portion 45A. Further, the pin 45 is provided with a flange 45C, serving as a proximal end portion, and a groove 45D. The groove 45D is provided in the outer peripheral surface of the pin 45, extends in the circumferential direction, and is located on the distal end side (positive x-side) at a position away from the flange 45C by a predetermined distance. The stopper 53 is fitted into the groove 45D so as to be attached to the pin 45 in the circumferential direction. The stopper 53 protrudes radially outward from the outer peripheral surface of the pin 45.

The rubber element 52 is fitted into a gap between the flange 45C and the stopper 53. The rubber element 52 is a cylindrical member that is provided on the outer peripheral surface of the pin 45 and extends in the circumferential direction. The rubber element 52 is elastically deformable by an external force, and may be formed of, for example, synthetic rubber or natural rubber. A groove 52A is formed in the outer peripheral surface of the rubber element 52 and extends in the circumferential direction. An inner edge 41A of the hole 47 of the retainer 41 is fitted into the groove 52A. Accordingly, the damper apparatus 50 is fixed to the retainer 41.

The slider 55 is a cylindrical member that is fitted into an insertion hole 26 of the airbag apparatus attachment part 25. The pin 45 is slidably inserted into a hole 55A of the slider 55.

The spring 54 is provided along the outer peripheral surface of the pin 45 between an end face 53A of the stopper 53 facing the positive x-side and an end face 55B of the slider 55 facing the negative x-side. Further, the spring 54 can contract between the end face 53A and the end face 55B in the x-direction. Accordingly, the distance between the end face 53A and the end face 55B is reduced, thereby allowing the damper apparatus 50 to contract in the x-direction In particular, in the present embodiment, the inner edge 41A of the hole 47 of the retainer 41 is bent (subjected to a bending process) such that the end of the inner edge 41A does not contact the rubber element 52. More specifically, the inner edge 41A of the hole 47 of the retainer 41 is hemmed such that inner edge 41A is bent at an angle of 180 degrees and the end of the inner edge 41A faces radially outward.

In a conventional damper apparatus, if the inner edge of a hole 47 of a retainer 41 (fixing element) directly contacts a rubber element 52 of the damper apparatus at a position where the damper apparatus is fixed to the retainer 41, wear and deterioration of the relatively soft rubber element 52 would be accelerated. Therefore, in order to prevent direct contact between the inner edge of the hole 47 and the rubber element 52, a protector formed of a material that is relatively harder than that of the rubber element 52 (that is less deformable by an external force) is interposed between the rubber element 52 and the inner edge of the hole 47. However, interposing the protector between the rubber element 52 and the inner edge of the hole 47 increases the number of parts of the conventional damper apparatus. Thus, manufacturing efficiency and ease of assembly need to be improved.

Conversely, in the present embodiment, the inner edge 41A of the hole 47 of the retainer 41 is hemmed as described above. Accordingly, even if the inner edge 41A of the hole 47 of the retainer 41 directly contacts the rubber element 52 of the damper apparatus 50, the bent inner edge 41A contacts the rubber element 52 and the end of the inner edge 41A does not directly contact the rubber element 52, thereby minimizing wear and deterioration of the rubber element 52. Accordingly, unlike the conventional damper apparatus, a protector and other parts are not required to be disposed at a position between where the rubber element 52 and the retainer 41, thus decreasing the number of parts.

Referring to FIG. 5 through FIG. 8, modifications of the bending process of the inner edge of the hole 47 of the retainer 41 will be described. The bending process is not limited to the hemming process described with reference to FIG. 3 and FIG. 4. As long as the inner edge of the hole 47 of the retainer 41 does not directly contact the rubber element 52, the inner edge of the hole 47 of the retainer 41 can be bent by any bending processes as illustrated in FIG. 5 through FIG. 8.

Figure 5:
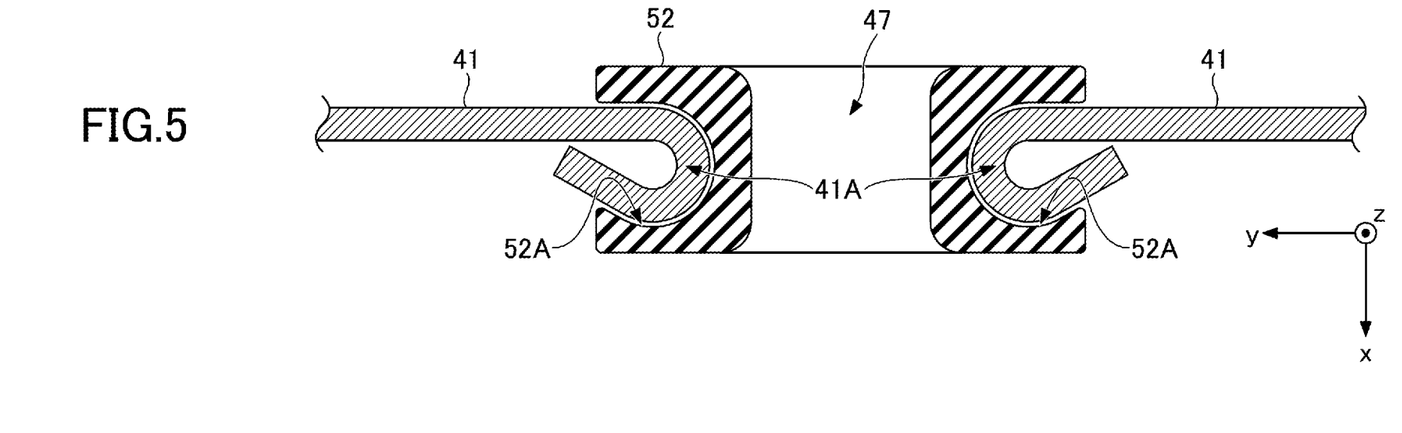
FIG. 5 is a schematic diagram illustrating a first modification of a bending process.

FIG. 5 is a schematic diagram illustrating a first modification of the bending process. As illustrated in FIG. 5, the inner edge 41A of the hole 47 of the retainer 41 is curled such that the inner edge 41A is bent in a round shape and the end of the inner edge 41A faces radially outward. Further, the groove 52A is formed in the outer peripheral surface of the rubber element 52 so as to fit the curled inner edge 41A.

Figure 6:
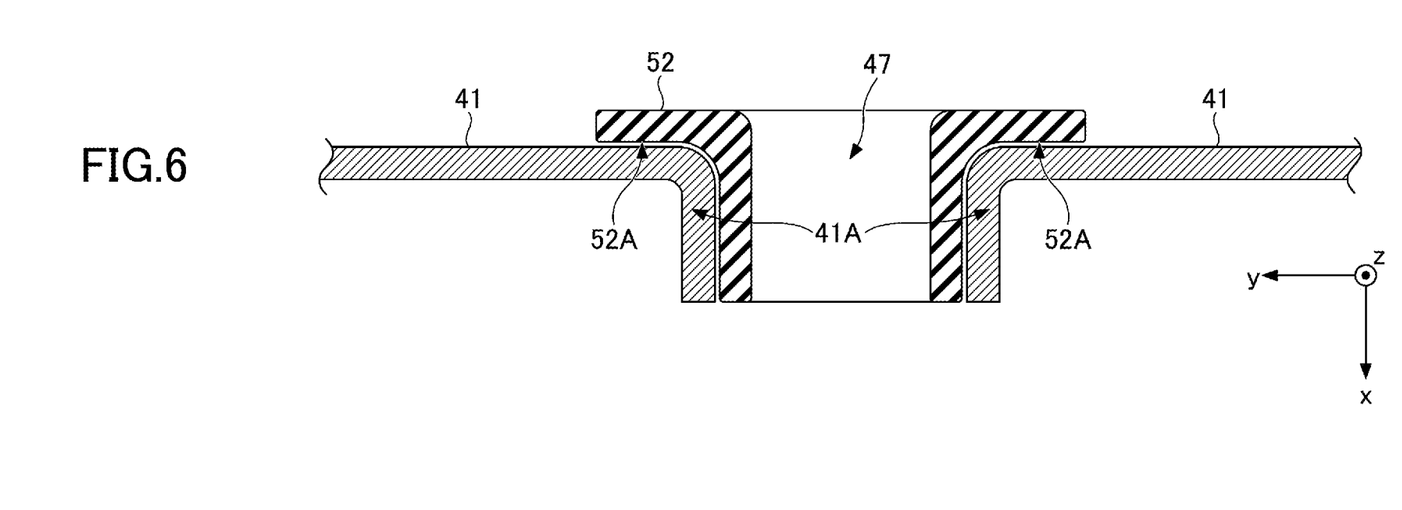
FIG. 6 is a schematic diagram illustrating a second modification of the bending process.

FIG. 6 is a schematic diagram illustrating a second modification of the bending process. As illustrated in FIG. 6, the inner edge 41A of the hole 47 of the retainer 41 is bent in an L-shape in cross section, namely bent at an angle of approximately 90 degrees so as to extend axially. Further, the groove 52A is formed in the outer peripheral surface of the rubber element 52 so as to fit the inner edge 41A that is bent in an L-shape in cross section.

Figure 7:
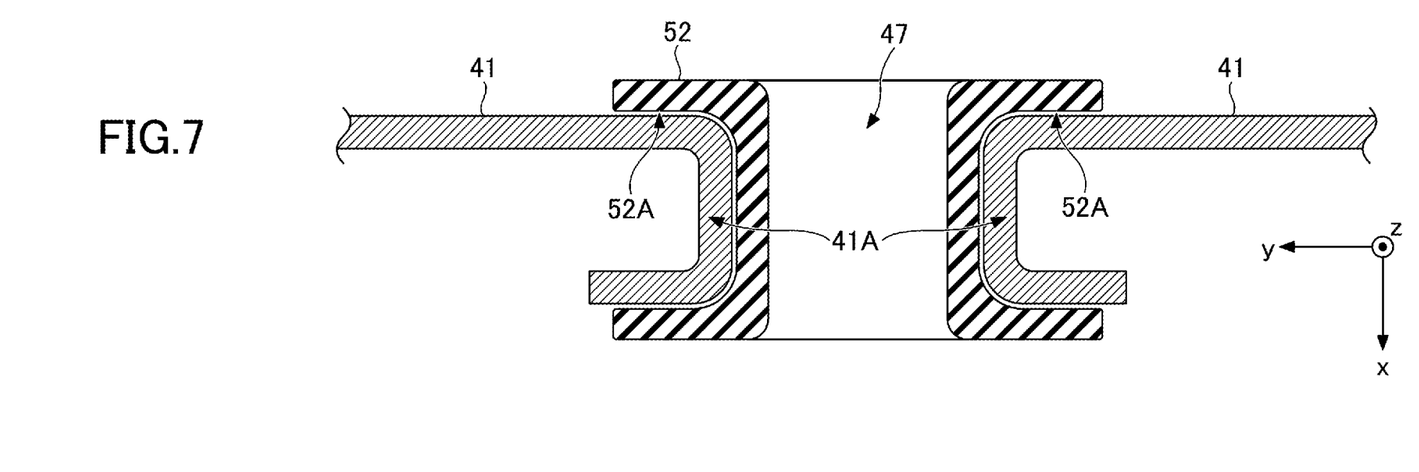
FIG. 7 is a schematic diagram illustrating a third modification of the bending process.

FIG. 7 is a schematic diagram illustrating a third modification of the bending process. As illustrated in FIG. 7, the inner edge 41A of the hole 47 of the retainer 41 is bent in a U-shape in cross section. Namely, the inner edge 41A of the hole 47 of the retainer 41 is bent twice at an angle of approximately 90 degrees such that the end of the inner edge 41A faces radially outward. Further, the groove 52A is formed in the outer peripheral surface of the rubber element 52 so as to fit the inner edge 41A that is bent in a U-shape in cross section.

Figure 8:
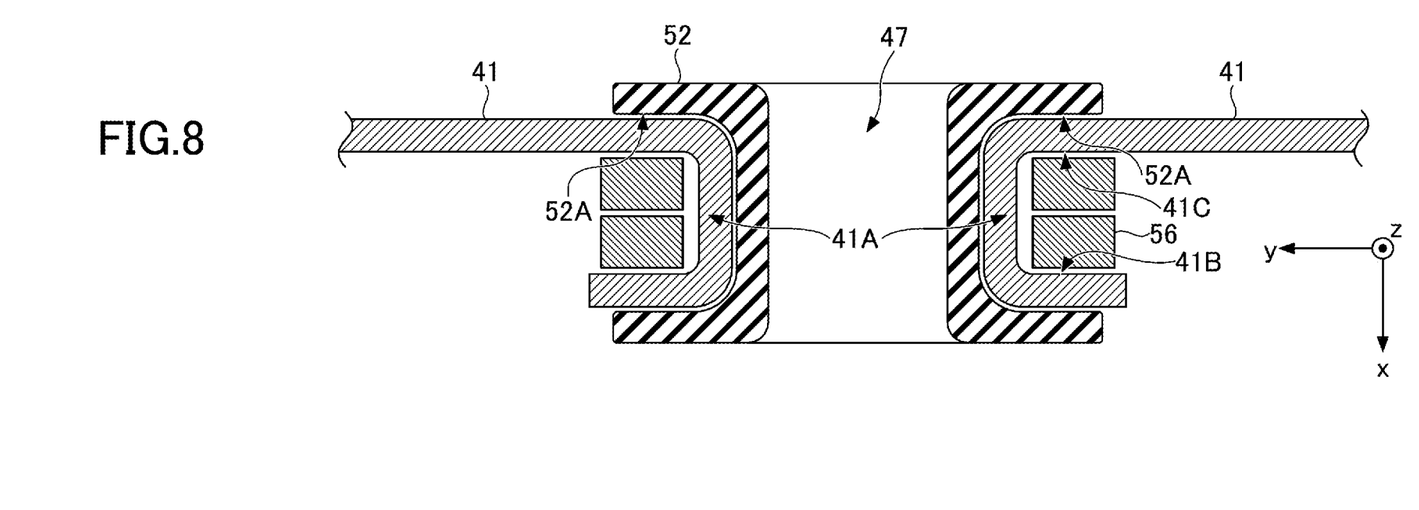
FIG. 8 is a schematic diagram illustrating a fourth modification of the bending process.

FIG. 8 is a schematic diagram illustrating a fourth modification of the bending process. As illustrated in FIG. 8, the inner edge 41A of the hole 47 of the retainer 41 is bent in a U-shape in cross section, and the inner surfaces of the U-shaped inner edge 41A face each other as in the case of FIG. 7. In this case, annular members 56 such as washers may be fitted into a gap between the inner surfaces of the U-shaped inner edge 41A. Accordingly, the the inner edge 41A of the hole 47 of the retainer 41 can be readily bent in a U-shape, and also the strength of the inner edge 41A can be enhanced by disposing the annular members 56, such as washers, inside the U-shaped inner edge 41A.

Next, a modification of the installation position of the damper apparatus 50 will be described with reference to FIG. 9 and FIG. 10.

Figure 9:
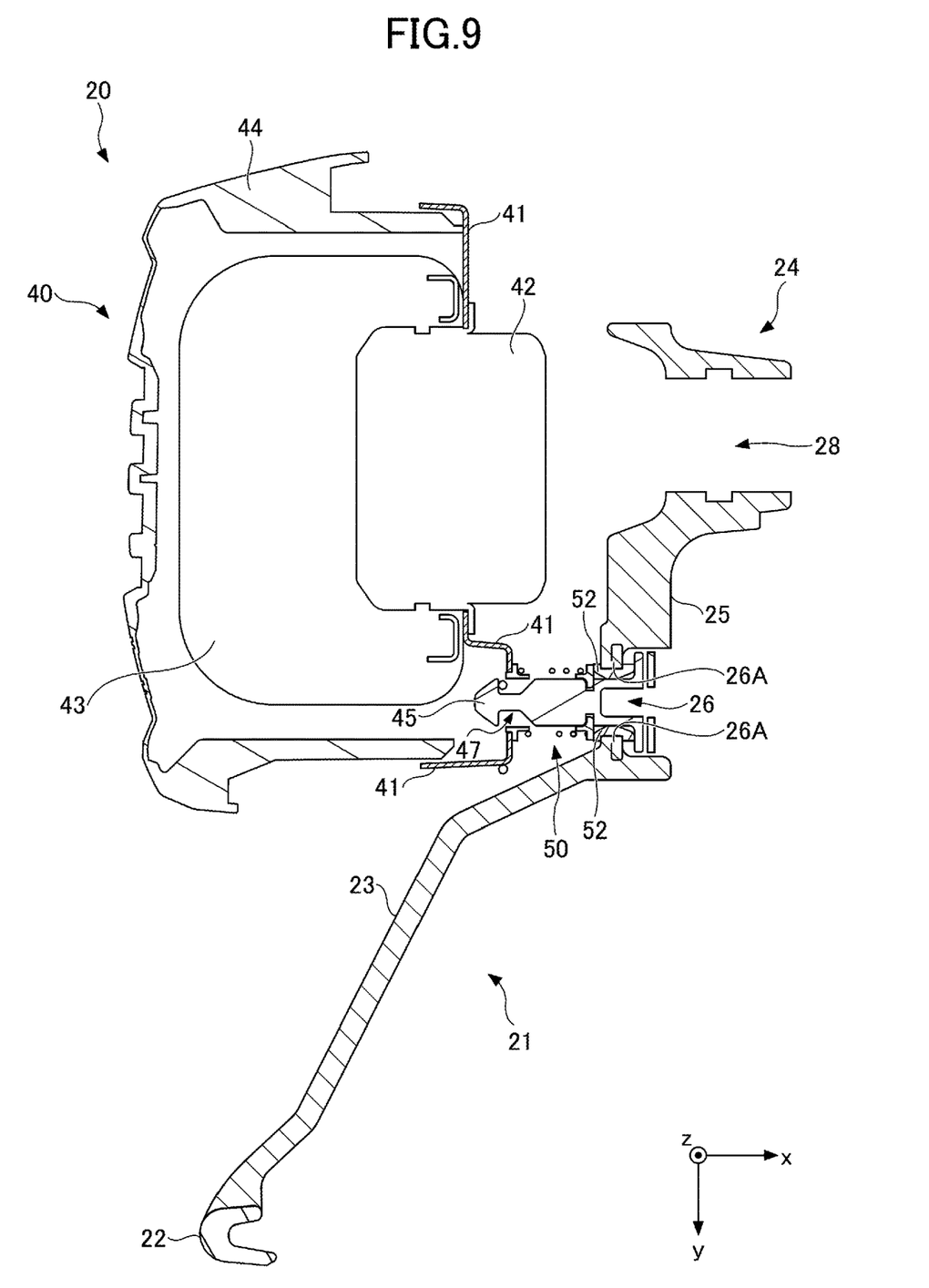
FIG. 9 is a cross-sectional view illustrating a first modification of the installation position of the damper apparatus.

FIG. 9 is a cross-sectional view illustrating a first modification of the installation position of the damper apparatus 50. As illustrated in FIG. 9, the fixing element provided with a hole, into which the damper apparatus 50 is fitted, may be the steering wheel body 21. In the example of FIG. 9, the damper apparatus 50 is fitted into the insertion hole 26 of the airbag apparatus attachment part 25. In this case, an inner edge 26A of the insertion hole 26 is bent, hemmed, or the like, and is fitted into the groove 52A of the rubber element 52 of the damper apparatus 50. The pin 45 of the damper apparatus 50 is inserted into the hole 47 of the retainer 41, and is fixed. That is, in the example of FIG. 9, the installation direction of the damper apparatus 50 is reversed in the x-direction, as compared to the configuration illustrated in FIG. 4 and FIG. 5.

Figure 10:
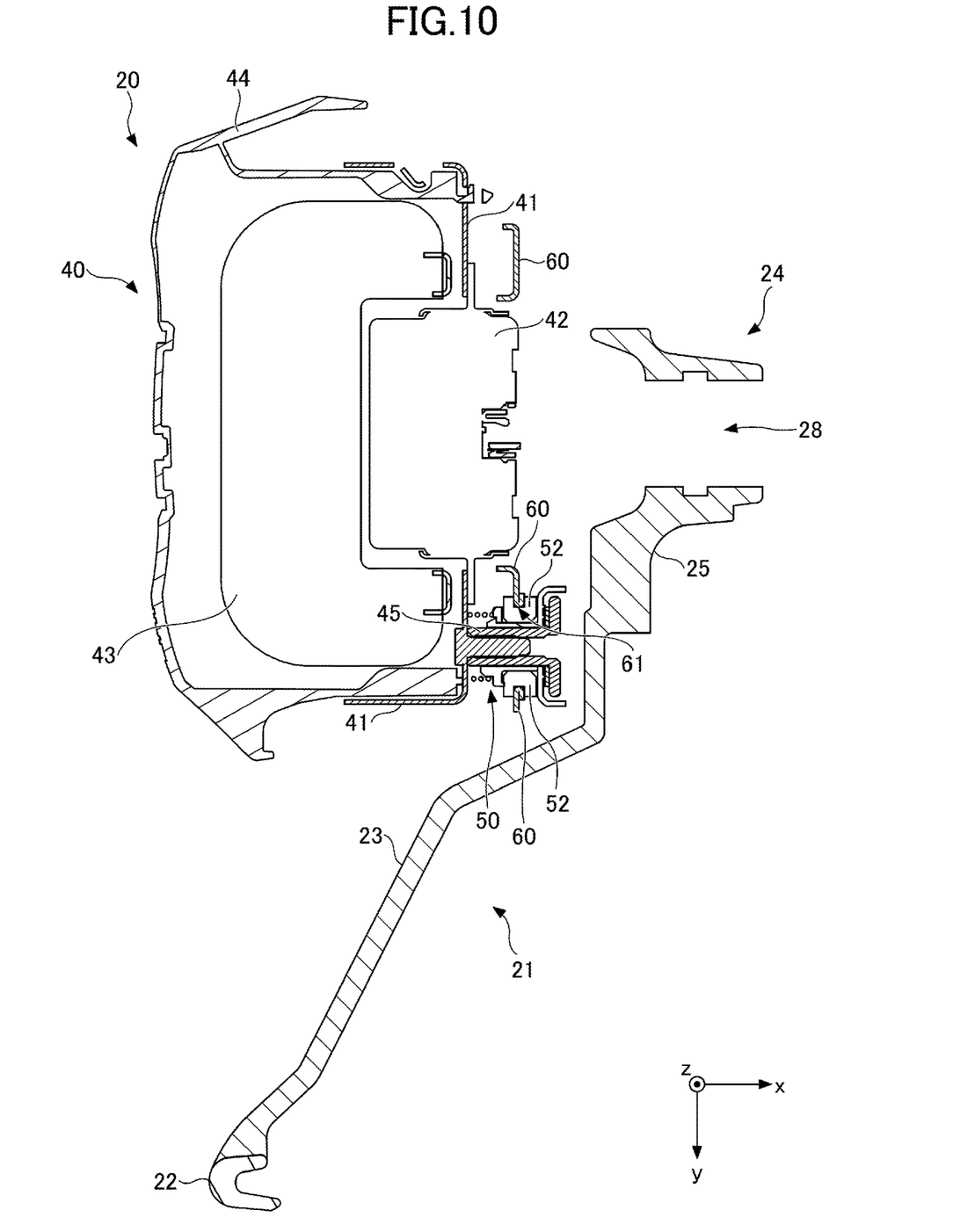
FIG. 10 is a cross-sectional view illustrating a second modification of the installation position of the damper apparatus.

FIG. 10 is a cross-sectional view illustrating a second modification of the installation position of the damper apparatus 50. The steering wheel 20 may be configured to include a horn plate 60 between the retainer 41 and the steering wheel body 21. The horn plate 60 may be fixed to the steering wheel body 21. In this configuration, the airbag apparatus 40 is supported by the horn plate 60 via the retainer 41 and the damper apparatus 50. Further, the retainer 41 is supported by the steering wheel body 21 via the horn plate 60.

As illustrated in FIG. 10, the steering wheel 20 includes the horn plate 60. In this configuration, the fixing element provided with a hole, into which the damper apparatus 50 is fitted, may be the horn plate 60. Specifically, the damper apparatus 50 is fitted into a hole 61 provided in the horn plate 60. The inner edge of the hole 61 is bent, hemmed, or the like, and is fitted into the groove 52A of the rubber element 52 of the damper apparatus 50. The pin 45 of the damper apparatus 50 is fixed to the retainer 41.

Although specific embodiments have been described above, the present disclosure is not limited to the above-described embodiments. These described embodiments may be modified by a person skilled in the art as long as the features of the present disclosure are included. The arrangement, conditions, and shapes of the structural elements as described in the embodiments are not limited to the arrangement, conditions, and shapes as described, and may be modified as necessary. It should be noted that combination of the elements of the above-described embodiments may be changed as long as no technical contradiction occurs.

What is claimed is:

1. A steering wheel comprising:
   a steering wheel body;
   a retainer supported by the steering wheel body and provided with a hole;
   an airbag apparatus fixed to the retainer; and
   a damper apparatus disposed between the steering wheel body and the retainer,
   wherein one end of the damper apparatus is fixed to the retainer by being fitted into the hole provided in the retainer,
   wherein the damper apparatus includes an elastic body, the elastic body extending in a circumferential direction along an inner edge of the hole and being formed so as to fit the inner edge of the hole,
   wherein the inner edge of the hole of the retainer is bent such that an end of the inner edge does not contact the elastic body,
   wherein the inner edge of the hole of the retainer is hemmed, curled, bent in an L-shape in cross section, or bent in a U-shape in cross section, and
   wherein the inner edge of the hole of the retainer is bent in the U-shape in the cross section, inner surfaces of the U-shaped inner edge face each other, and an annular member is fitted into a gap between the inner surfaces of the U-shaped inner edge.

2. A steering wheel comprising:
a steering wheel body provided with a hole;
a retainer supported by the steering wheel body;
an airbag apparatus fixed to the retainer; and
a damper apparatus disposed between the steering wheel body and the retainer,
wherein one end of the damper apparatus is fixed to the steering wheel body by being fitted into the hole provided in the steering wheel body,
wherein the damper apparatus includes an elastic body, the elastic body extending in a circumferential direction along an inner edge of the hole and being formed so as to fit the inner edge of the hole,
wherein the inner edge of the hole of the steering wheel body is bent such that an end of the inner edge does not contact the elastic body,
wherein the inner edge of the hole of the steering wheel body is hemmed, curled, bent in an L-shape in cross section, or bent in a U-shape in cross section, and
wherein the inner edge of the hole of the steering wheel body is bent in the U-shape in the cross section, inner surfaces of the U-shaped inner edge face each other, and an annular member is fitted into a gap between the inner surfaces of the U-shaped inner edge.

3. A steering wheel comprising:
a steering wheel body;
a horn plate fixed to the steering wheel body and provided with a hole;
a retainer supported by the horn plate;
an airbag apparatus fixed to the retainer; and
a damper apparatus disposed between the steering wheel body and the retainer, and
wherein one end of the damper apparatus is fixed to the horn plate by being fitted into the hole provided in the horn plate,
wherein the damper apparatus includes an elastic body, the elastic body extending in a circumferential direction along an inner edge of the hole and being formed so as to fit the inner edge of the hole,
wherein the inner edge of the hole of the horn plate is bent such that an end of the inner edge does not contact the elastic body,
wherein the inner edge of the hole of the horn plate is hemmed, curled, bent in an L-shape in cross section, or bent in a U-shape in cross section, and
wherein the inner edge of the hole of the horn plate is bent in the U-shape in the cross section, inner surfaces of the U-shaped inner edge face each other, and an annular member is fitted into a gap between the inner surfaces of the U-shaped inner edge.

\* \* \* \* \*